United States Patent [19]
Pierce

[11] Patent Number: 5,398,577
[45] Date of Patent: Mar. 21, 1995

[54] METHOD AND APPARATUS FOR TREE FELLING

[76] Inventor: Danny K. Pierce, 33928 Highway 160 East, Durango, Colo. 81301

[21] Appl. No.: 150,373

[22] Filed: Nov. 10, 1993

[51] Int. Cl.⁶ .................. A01G 23/08; B26D 5/00
[52] U.S. Cl. .................... 83/745; 33/21.3;
   33/521; 33/558.01; 33/674; 83/762; 144/34 R;
   144/34 B; 144/3 N; 144/335; 144/336; 144/380
[58] Field of Search ........... 33/21.3, 521, 529, 674,
   33/679, 558.01, 558.02; 83/745, 762; 144/3, 3
   N, 34 R, 34 B, 335, 336, 364, 380

[56] References Cited

U.S. PATENT DOCUMENTS

| | | |
|---|---|---|
| 21,435 | 9/1858 | Moon . |
| 181,809 | 9/1876 | Williams . |
| 230,420 | 7/1880 | Kahle . |
| 230,421 | 7/1880 | Kahle . |
| 277,351 | 5/1883 | Sadler . |
| 608,183 | 8/1898 | Davis . |
| 795,061 | 7/1905 | Pilsatneeks . |
| 818,627 | 4/1906 | Iwan . |
| 984,697 | 2/1911 | Pfaff . |
| 1,002,678 | 9/1911 | Grondahl . |
| 1,195,330 | 8/1916 | Binney . |
| 1,345,071 | 6/1920 | Butler . |
| 1,516,288 | 11/1924 | Godfrey . |
| 1,610,192 | 12/1926 | Battle . |
| 1,635,908 | 7/1927 | Stuart . |
| 1,642,668 | 9/1927 | Brey . |
| 1,805,318 | 5/1931 | Steffler . |
| 2,158,210 | 5/1939 | Zimowske . |
| 2,272,860 | 2/1942 | Wolfe . |
| 2,334,422 | 11/1943 | Lehnus . |
| 2,353,873 | 7/1944 | Brownlee . |
| 2,376,270 | 5/1945 | Paulson ......................... 83/745 |
| 2,478,081 | 8/1949 | Beets . |
| 2,557,268 | 6/1951 | Ficken ........................... 83/745 |
| 2,608,220 | 8/1952 | Cauthen . |
| 2,617,452 | 11/1952 | Dowling, Sr. ................. 83/745 |
| 2,655,771 | 10/1953 | Kline . |
| 3,364,960 | 1/1968 | Collins, Jr. et al. .......... 83/745 |
| 3,548,899 | 12/1970 | Emerson . |
| 3,970,124 | 7/1976 | Hamilton .................... 144/3 N |
| 3,971,422 | 7/1976 | Silvey . |
| 3,977,446 | 8/1976 | Silvey . |
| 4,053,145 | 10/1977 | Steele . |
| 4,169,173 | 9/1979 | Bergholm et al. ........... 144/3 N |
| 4,580,345 | 4/1986 | Andrew . |
| 4,854,206 | 8/1989 | Wilfong ....................... 83/745 |
| 5,107,594 | 4/1992 | Ferreras ....................... 83/745 |

FOREIGN PATENT DOCUMENTS

| | | |
|---|---|---|
| 574898 | 3/1933 | Germany . |
| 126453 | 5/1919 | United Kingdom . |
| 482149 | 3/1975 | U.S.S.R. . |
| 596190 | 3/1978 | U.S.S.R. . |
| 1060145 | 12/1980 | U.S.S.R. . |
| 1455227 | 1/1989 | U.S.S.R. . |

*Primary Examiner*—W. Donald Bray
*Attorney, Agent, or Firm*—Kenton L. Freudenberg; Maxwell C. Freudenberg

[57] ABSTRACT

A method and apparatus for aiming a tree to be felled including a tool for precisely marking a face notch to be cut into a tree trunk, said tool comprising a main body, an aiming rod on the main body, and two pivoting tree-engaging marking arms mounted pivotably together on the main body for partially encircling the tree trunk and identifying the upper and lower cuts of a generally horizontal portion of a hinging notch when the aiming rod is aimed in the direction of fall. The tool includes angular adjustments to allow marking an aiming notch which compensates for the lean of a tree and/or for trees with trunks of irregular cross section.

20 Claims, 12 Drawing Sheets

METHOD AND APPARATUS FOR TREE FELLING

BACKGROUND OF THE INVENTION

The felling of trees can often require that they be dropped quite accurately to insure that they cause no damage to structures such as homes, buildings power lines and the like. Similarly, in a lumbering operation it may be necessary to drop a tree accurately to insure that its value for lumber is not decreased by damage which it may sustain in falling. Experienced loggers and others who regularly cut down trees have long known methods of aiming a tree to be cut down, but such methods have typically required a relatively high degree of experience and/or expertise by the feller. The present invention is intended to provide an accurate guide for the aiming of a tree to be felled so that a relatively inexperienced individual may accurately and safely drop a tree or so that an experienced tree feller may be even more precise in the aiming of a tree.

SUMMARY OF THE INVENTION

The well known method of aiming the direction of fall of a vertically standing tree, or, more specifically, controlling the final orientation or placement of the fallen tree, is to cut out a "face wedge" to create a generally horizontal "V" shaped notch on the side of the tree's trunk toward the desired direction of fall with the horizontal apex of the notch being oriented perpendicular to the horizontal line defining the direction of fall and having a depth of approximately one-third of the diameter of the tree. The line defined by this apex is essentially a chord of the curve defined by the circumference of the tree trunk in a horizontal plane which passes through the apex. As described further below, the curve of the tree's circumference is a closed curve but need not be circular, nor even regular or symmetrical. A "backcut" parallel to the apex of the notch in a horizontal plane is then made through the tree trunk from the side of the tree opposite the notch. The portion of the trunk remaining between the backcut and the face notch is long and narrow creating a "hinge" which effectively determines the direction in which the tree may fall. The positioning of the notch has traditionally been accomplished by merely "eyeballing" or visually estimating the location of the notch and may depend greatly upon the cutter's experience. Typically it is also necessary that the tree-cutter be aiming the tree during the process of cutting the notch and must necessarily direct attention away from the cut being made. While the procedure of visually estimating a direction of fall may be relatively straightforward in case of a tree standing vertically, it may become substantially more difficult where a tree is leaning to some extent. In such a case the tree will generally require that the face notch be oriented away from the direction of lean by an amount equal to the amount of the tree's lean away from the direction of fall. In other words, if a tree is to be dropped to the north, a face cut would normally be made on the north side of the trunk. However if the same tree is leaning to the east at an angle of 5 degrees from vertical, the face notch would need to be made 5 degrees to the west of north on the tree trunk.

The present invention, in contrast to the traditional method of "eyeballing", provides a method and structure for visually aiming precisely along the desired line of fall and marking a tree so that a level notch may be cut which corresponds directly to the direction of fall. The tree is marked prior to cutting so that the cutter may focus entirely on the cuts to be made without having to check the positioning of the cuts as they are being made by stopping and/or looking away from the cutting process.

The tree marking device of the present invention provides for marking the location on a tree trunk for a hinging notch to be cut in the trunk to encourage the tree to fall with an upper part of the trunk falling to the ground in a desired direction relative to the base of the tree trunk, and includes a means for aiming in a chosen direction, a means of partially encircling the tree trunk and identifying the location for a the horizontal and angled portions of a hinging notch when the aiming means is aimed in the desired direction of fall.

It is an object of the present invention to provide a method and guide which will allow accurate aiming of the path of a tree to be felled.

It is an object of the present invention to provide a method and guide which will allow accurate aiming of a tree to be felled and which is capable of compensating for the lean of a tree which does not stand vertically.

It is another object of the present invention to provide a method of marking the cuts necessary to fell a tree in a particular direction.

It is a further object of the present invention to provide a means of mechanically establishing the precise location of a "face notch" for the purpose of aiming a tree to be felled.

It is a further object of the present invention to provide a means of mechanically establishing the precise location of a "face notch" for the purpose of aiming a tree which has a trunk of irregular or non-circular cross-section.

It is another object of the present invention to provide a method of marking the cuts necessary to fell a tree in a particular direction prior to making any cuts so that the cutter may make the cuts in a continuous fashion without having to interrupt the cutting or direct any attention away from the cutting process.

DESCRIPTION OF THE PREFERRED EMBODIMENT

Figure 13:
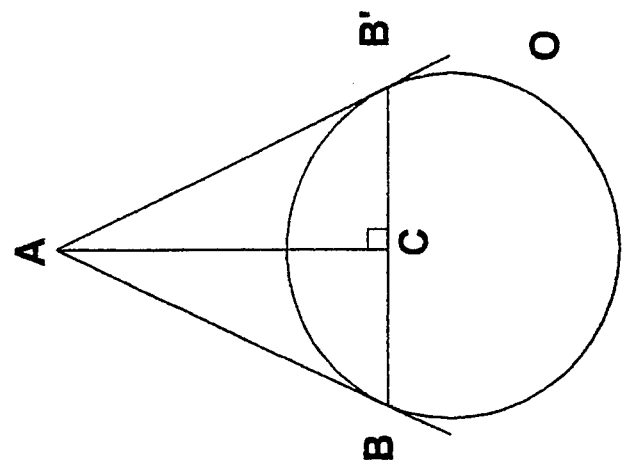
FIG. 13 is an illustration of basic geometric principles of the preferred embodiment.

The present invention provides a tool which incorporates simple geometric principles in order to define a face notch with an apex corresponding to a chord across the cross section of a tree trunk. In a simple embodiment the present invention may rely upon the fact that tree trunks tend to be more or less circular in cross section and incorporates pivotable arms of equal length which are geared together to insure that during pivoting movement, the angle between one arm and the axis or aiming line of the tool is always equal to the corresponding angle of the other arm. As illustrated in FIG. 13, on a given circle O, two line segments of equal length are drawn tangent to the circle from a single point A, to respective points B and B'. If line segment AC bisects the angle BAB' defined by line segments AB and AB' then line segment AC is perpendicular to BB'. In this illustration line segment BB' corresponds to the apex of the face notch, line segments AB and AB' correspond to the swingable arms of the tool, and line segment CA corresponds to the aimed direction of fall of a tree.

Figure 1:
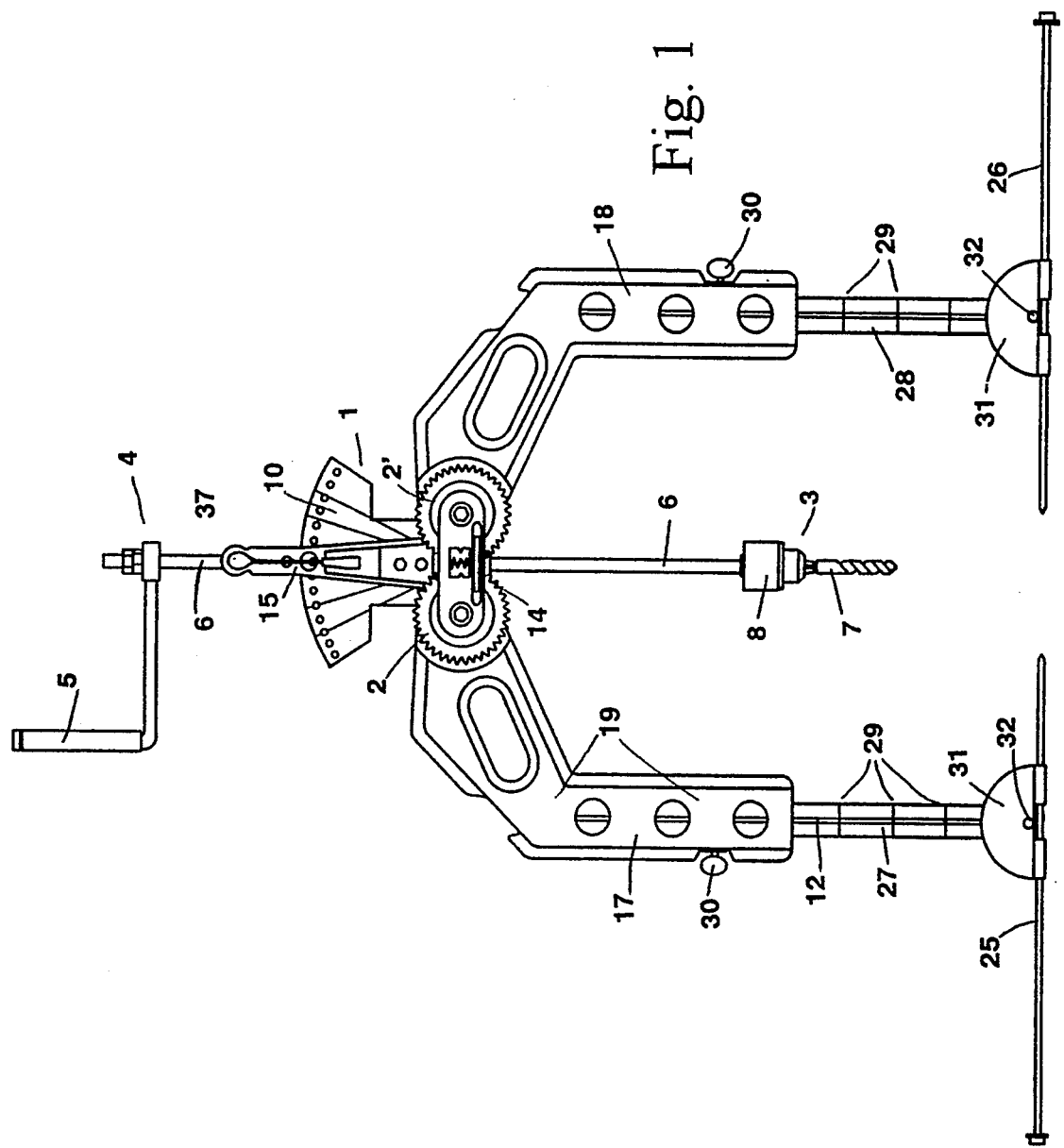
FIG. 1 is a plan view of the device of the preferred embodiment showing the pivot arms in a parallel or essentially unopened orientation.

The device of the preferred embodiment comprises a main body assembly 1 comprising a main guide plate 10 and an angle adjusting body 15, which is pivotable at pivot 16 and lockable with respect to the main guide plate 10 by use of a spring biased pin engaging with any one of the detents 11. The angle adjusting body 15 is normally locked to the main guide plate 10 in a "centered" position except when it is used as a means of compensating for a leaning tree as described further below. Rotatably and slidably mounted to the main guide plate 10 by means of bearings 9 is a primary aiming means comprising an aiming rod or shaft 6 having a handle end 4 with a crank arm 5 and a drilling or anchor end 3. As seen in FIG. 1 the drill end incorporates a standard drill chuck 8 holding a replaceable spiral drill bit 7. To use the device, the shaft 6 is aligned in a horizontal position with the handle end pointed in the direction in which a chosen tree is to be felled and the drill tip end pointed generally toward the tree center. With the shaft so aimed the device is initially secured to the tree by rotating the hand crank 5 about the axis of the shaft 6 so that the drill bit 7 on the opposite end of the shaft 6 bores horizontally into the tree trunk T. Alternatively, a pointed, threaded tip may be substituted for the bit to provide a tip which will actively and securely embed itself into the tree trunk when the shaft 6 is rotated. The main guide plate 10 is accurately levelled by a using bubble level 14 as a visual indicator. Alternatively if the device is oriented to an inverted position so that the aiming rod 6 is positioned above the plate 10, the device, being equally balanced about the aiming rod and having a center of gravity slightly below the axis of the rod, will tend to seek a the desired level position in which the arms 17 and 18 and plate 10 are each in generally horizontal planes.

Figure 5:
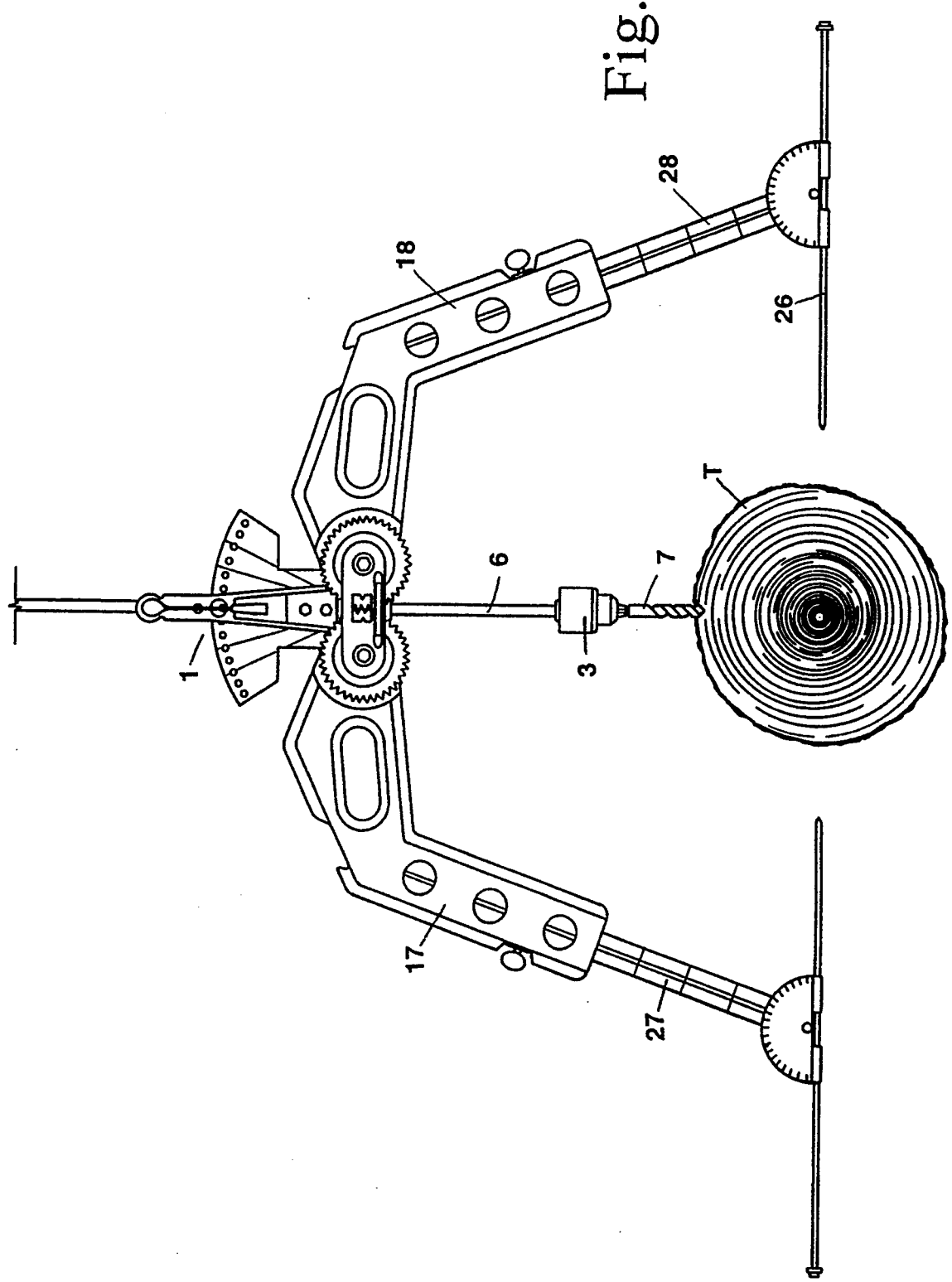
FIG. 5 is a plan view of the preferred embodiment showing the main shaft of the tool anchored to a tree with the pivot arms in an opened orientation prior to engagement of the tree penetrating spikes.
Figure 6:
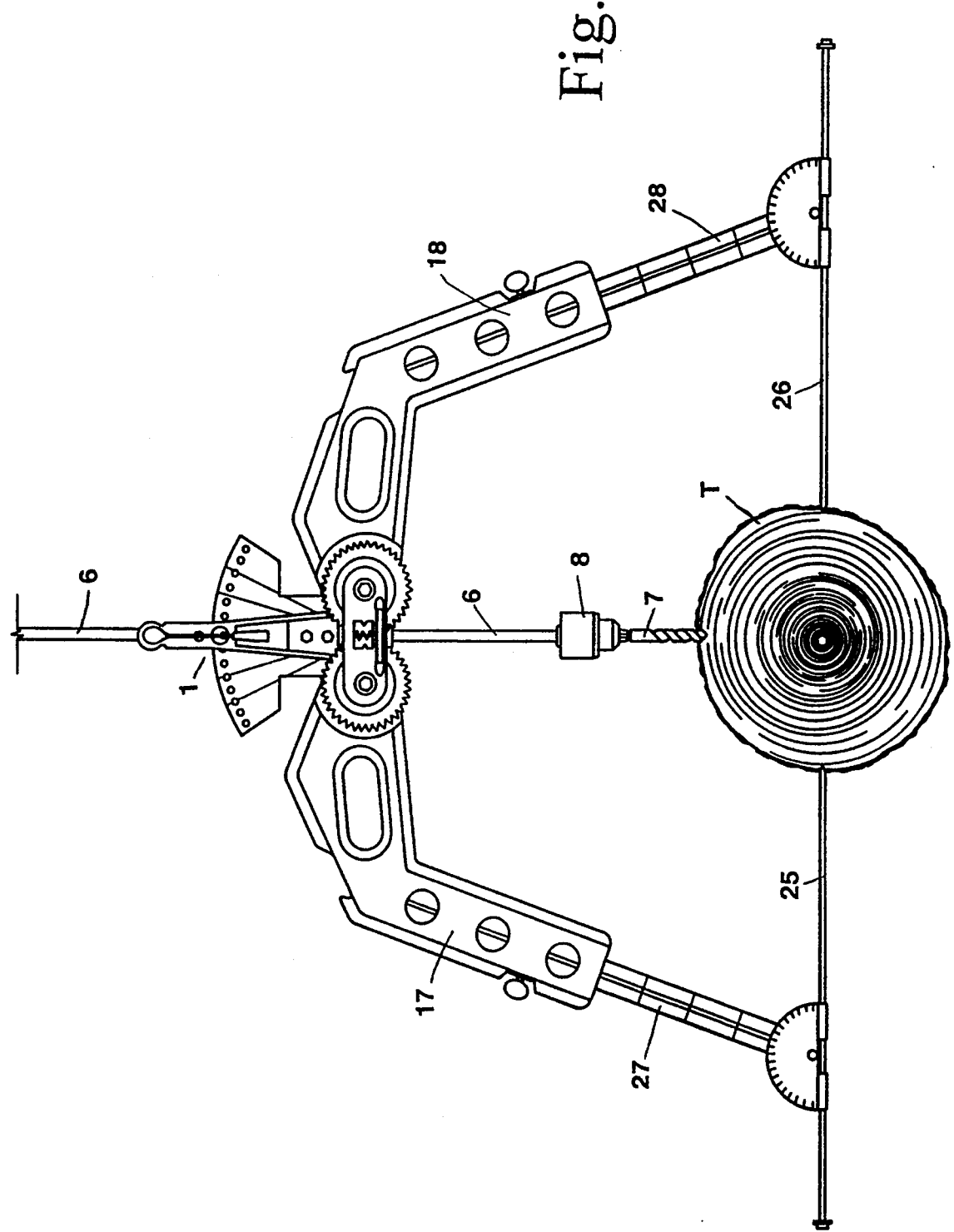
FIG. 6 is a plan view of the preferred embodiment similar to FIG. 5 showing the main shaft of the tool anchored to a tree with the tree penetrating spikes engaged in a tree trunk.
Figure 9:
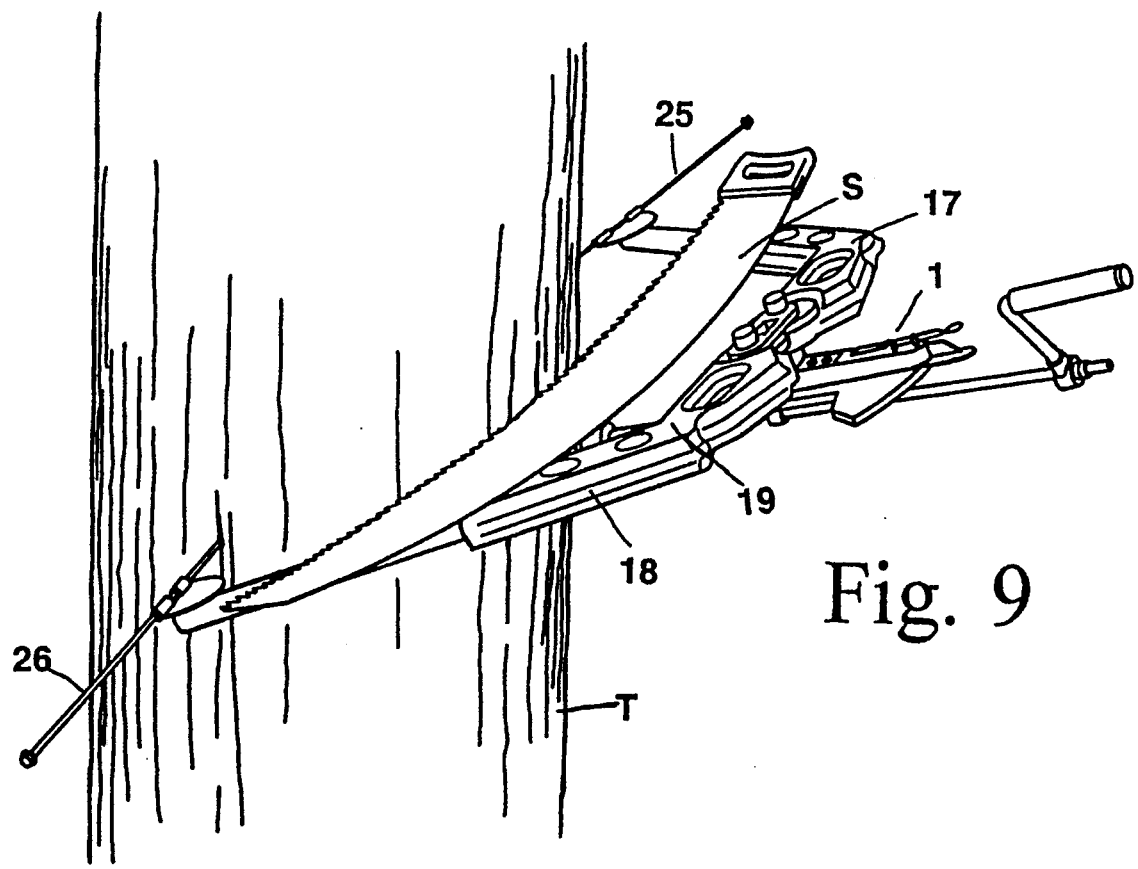
FIG. 9 is a view similar to FIG. 8 showing a saw laid flat on the upper surface of the tool of the preferred embodiment to scribe the tree and mark the location of the upper angled cut for a face.
Figure 10:
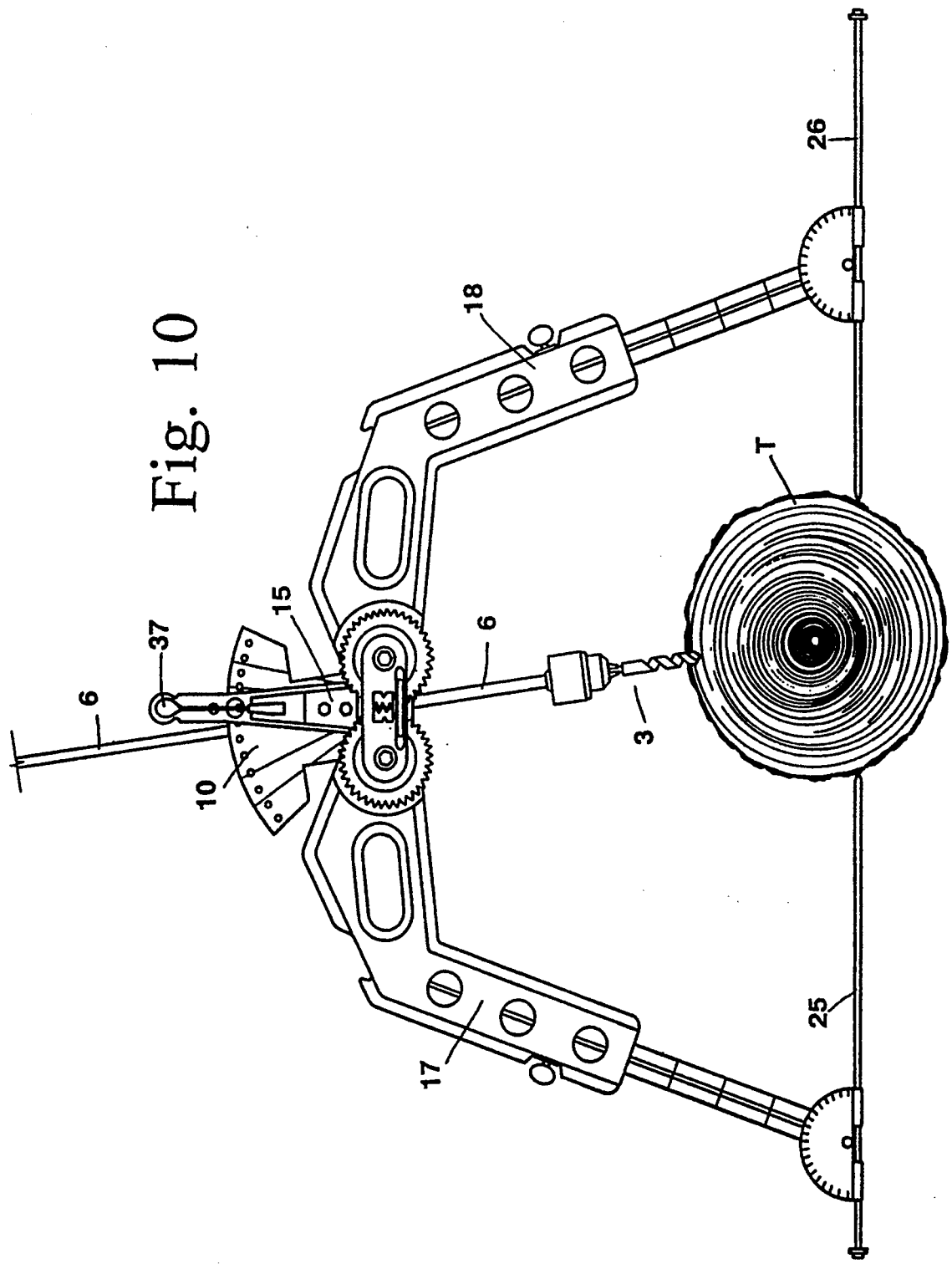
FIG. 10 is a plan view of the device of the preferred embodiment showing the adjusting body in an angled orientation for use on a leaning tree.

In the case of a tree with a relatively round trunk, once the shaft 6 is anchored as seen in FIG. 5 and the main body assembly 1 is levelled, the main body is moved toward or away from the trunk T along shaft 6 until the ends of caliper arms 17 and 18 may be pivoted into contact with the tree trunk T. The caliper arms 17 and 18 are essentially coplanar with a flat upper planar surface 19 which can be used as an indicating or guide means for the physical marking of a tree. As seen in FIG. 9 this marking may be accomplished by using a hand saw S aligned flat against the planar surfaces 19 to scribe onto the surface of the tree trunk T. Each caliper arm 17 and 18 is pivotably mounted near one end to the angle adjusting body 15 by a pivot bolt 21 with the axis of the pivot being essentially perpendicular to the plane defined by the arms. The arms 17 and 18 are engaged together by meshed gear teeth on gears 2 and 2' so that the pivoting movement of the two arms is always simultaneous and equal in angular magnitude. Thus, with the angle adjusting body 15 centered on the main guide plate 10, the arms are pivotably mounted with respect to one another and to the shaft 6 in such a manner that a line passing between the free ends of the arms is always perpendicular to the aiming shaft.

Figure 3:
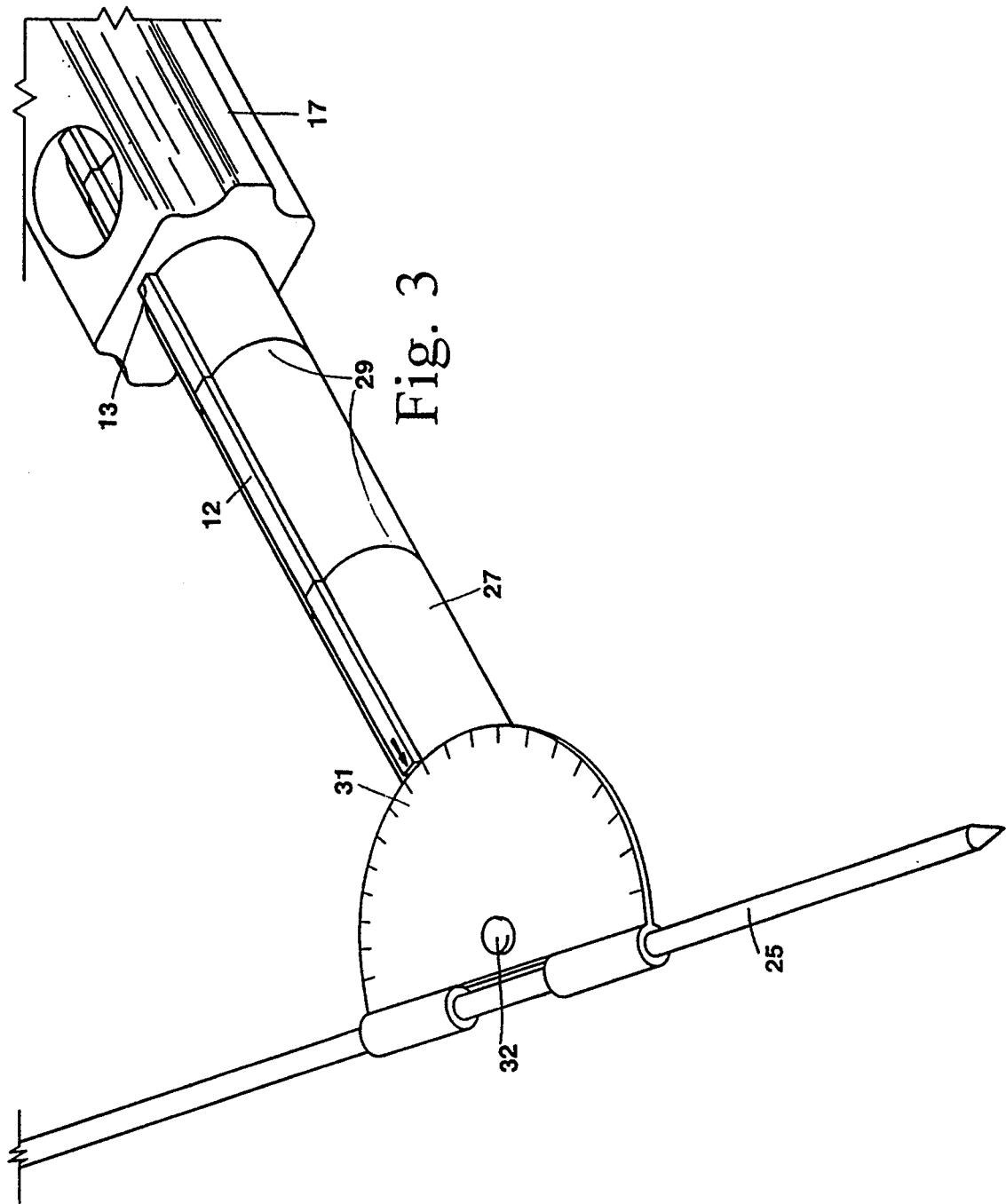
FIG. 3 is a perspective view of showing detail of a telescoping arm and pivotable spike of an preferred embodiment.
Figure 8:
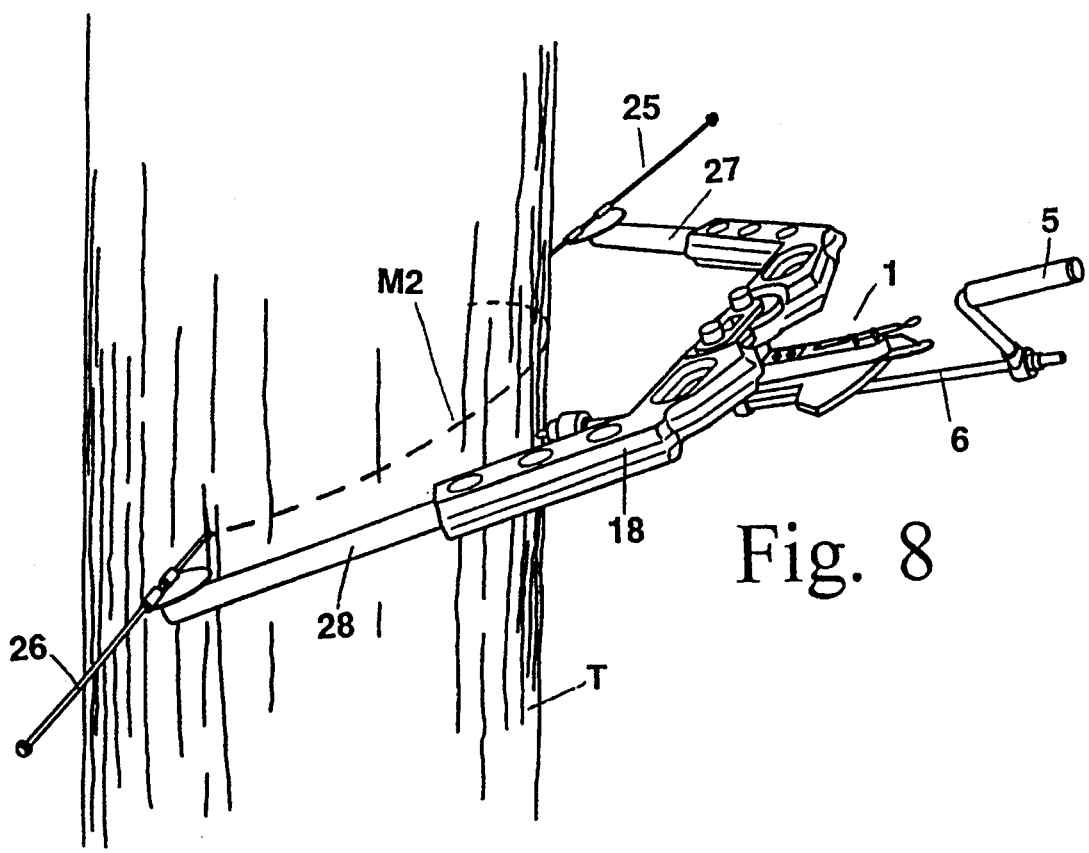
FIG. 8 is a perspective view of the preferred embodiment showing the spikes engaged to a tree trunk and the device pivoted upward with the main shaft re-engaged with the tree so that the device is oriented to guide the marking of the upper angled cut for a face wedge.
Figure 4:
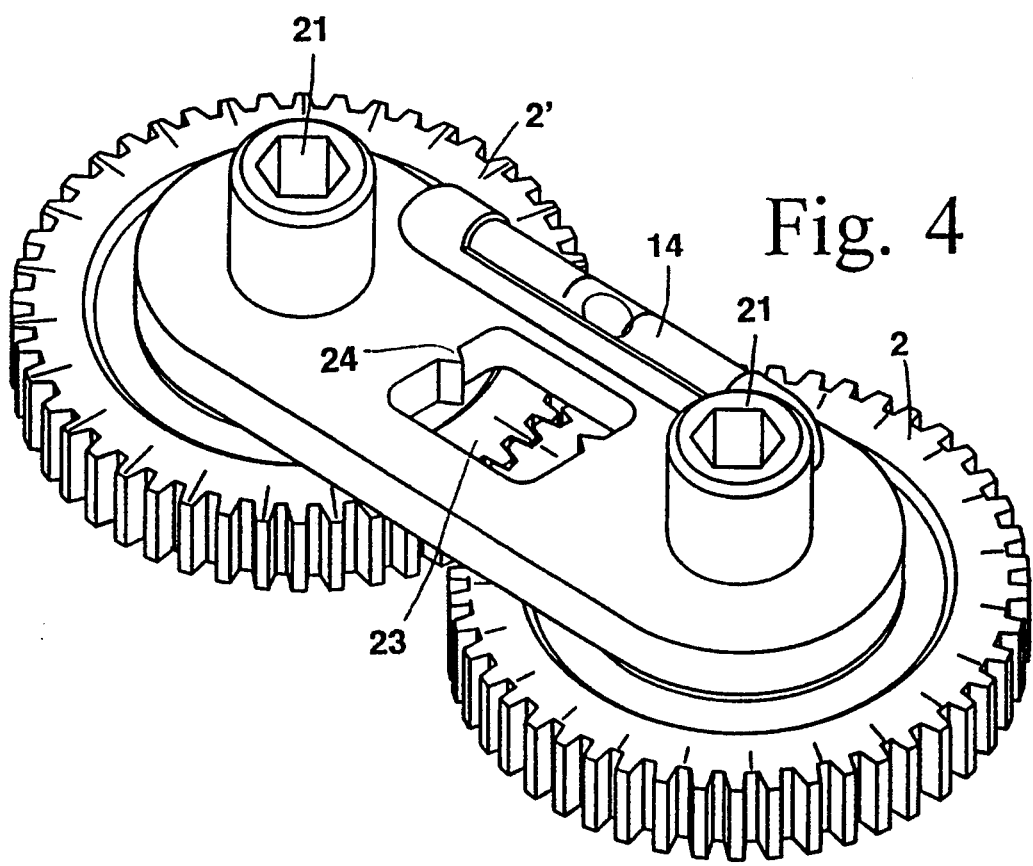
FIG. 4 is a perspective view of showing detail of the arm gears, the angle indicator window and the bubble level of the preferred embodiment.

As shown in FIG. 1 and detailed in FIG. 3 each arm 17 and 18 has a respective telescoping tubular arm extension 27 or 28 which slides within the arm to provide for adjustability of the arm length and allowing the device to be readily used on a wide range of tree trunk diameters. Each extension is provided with a rib 12 which engages a channel 13 in the arm to prevent rotation of the extension about its axis. This rib 12 also effectively provides an extension of the flat guide surface 19 of arms 17 and 18. Each extension 27 or 28 is secured in place at a desired length with a manually operable set screw 30 passing through arm 17 or 18 and into contact with its respective extension 27 or 28.

Although the length of each arm is independently adjustable in use, the two arm extensions 27 and 28 are always set to an identical length to insure that a line passing through their respective ends is perpendicular to the aiming rod 6 when that rod is in its centered position as previously described. Each arm is marked with corresponding marks 29 to provide a visual indication that insure that the two extensions are fixed at the same length.

Figure 2:
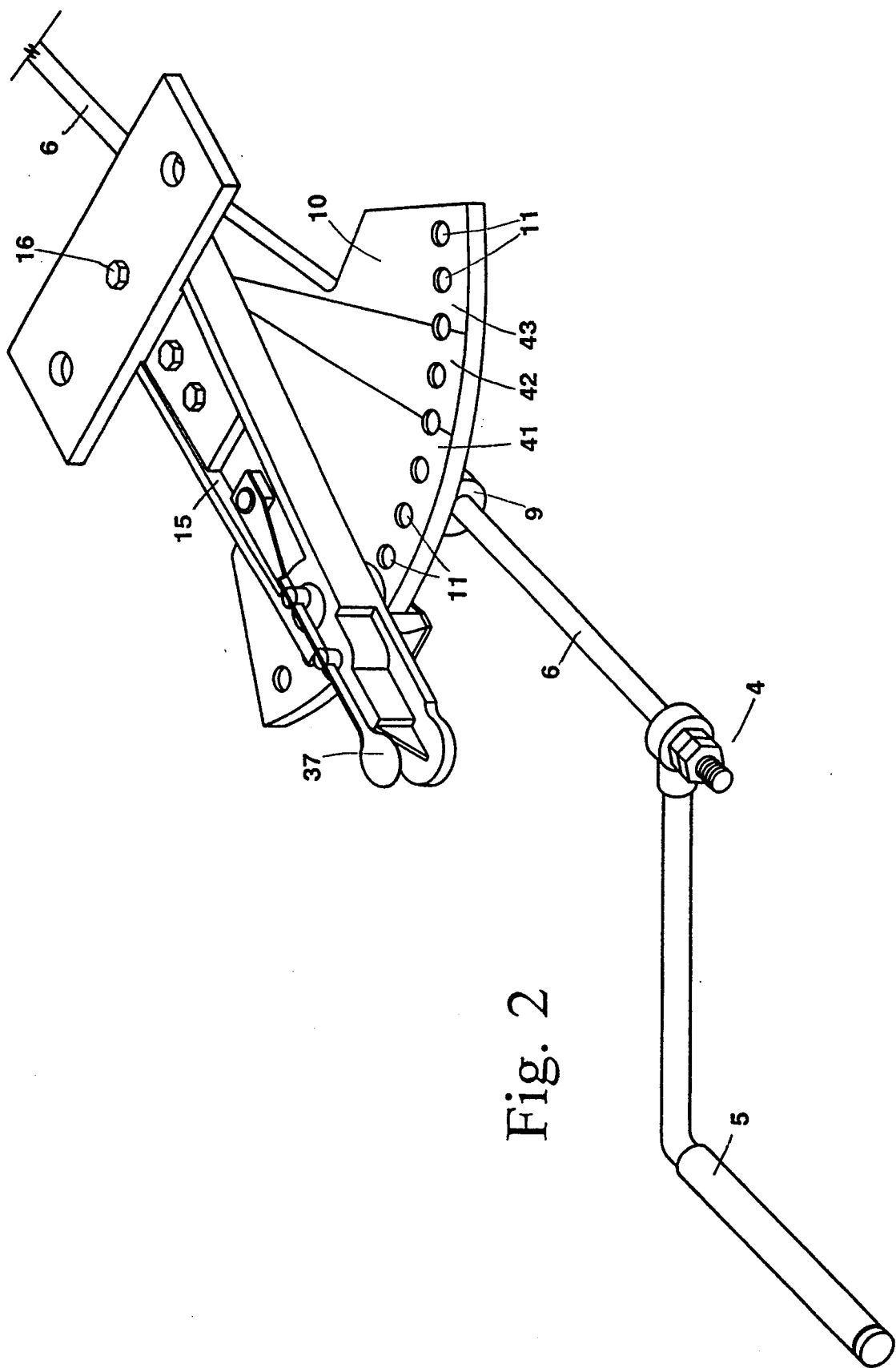
FIG. 2 is a perspective view of showing detail of the latching angle adjusting mechanism of the preferred embodiment.
Figure 7:
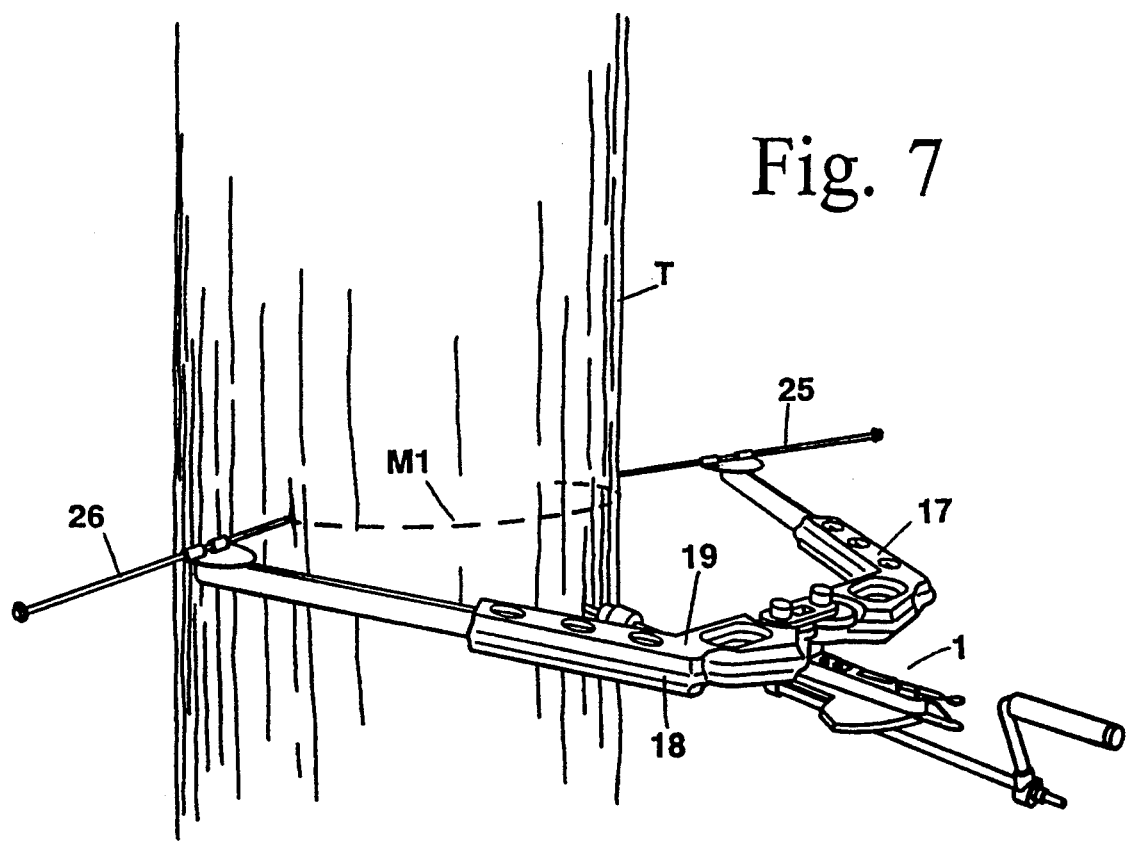
FIG. 7 is a perspective view of the preferred embodiment showing the aiming shaft and spikes engaged to a tree trunk and the device oriented to guide the marking of the lower horizontal cut a face wedge.

At the end of each extension, each arm is provided with a rotatable pointed tree penetrating spike or prong 25 or 26 having a pointed penetrating end. Each spike is mounted to be slidable along its axis to allow the pointed end to engage and be driven into the tree. Once the shaft 6 is secured to the tree as seen most clearly in FIG. 5, the caliper arms 17 and 18 are pivoted toward the tree, with the extensions 27 and 28 usually coming into contact with the tree on opposing sides as shown in FIG. 2. Each tree penetrating spike 25 and 26 is then driven into the tree, to further secure the device and to mark the respective ends of the apex of the face wedge to be cut from the tree trunk T. While the device is positioned in the horizontal orientation illustrated in FIG. 7, the flattened arms 17 and 18 and their extensions 27 an 28 are used as a planar guide and indicating means and a horizontal mark M1 is placed on the tree trunk T using any suitable marking material, such as, for example, brightly colored chalk or a felt tipped marking pen.

Once the horizontal mark of the face wedge has been made, the drill tip is extracted from the tree, leaving the device secured to the tree by only the spike points. The device is then pivoted upward as seen in FIG. and a second mark M2 is made, again using the plane defined by the arms 17 and 18 and their respective extensions as a guide. During this step the main shaft may be re-enagaged into the tree to hold the device in position. Once the marks M1 and M2 have been made, the device can be removed from the tree. A cut is then made with a chainsaw in the planes defined by each of the marks M1 and M2. The marks M1 and M2 thus define distinct planes which in turn define a wedge shaped section of wood which, when removed, leaves a wedge-shaped notch having a linear apex which is perpendicular to the desired direction of fall as initially determined by the aim of the shaft 6. Following the classical method of felling a tree, a horizontal backcut is made parallel to the apex of the face notch and on the opposite side of the tree trunk. The direction of fall is perpendicular to the "hinge" of wood remaining between the face notch and the backcut. Although it is typically not necessary, the device of the preferred embodiment may also be used as a guide to mark the location of the backcut.

The preferred embodiment may also incorporate features to address difficulties which may be encountered in felling a tree. The two most common difficulties are (1) precisely aiming a tree which is leaning, and (2) precisely aiming a tree which has a trunk of unusual cross sectional shape. To allow precise aiming of a tree which is leaning the device of the preferred embodiment provides a means of rotating the markings around the tree trunk to place the notch to properly to correspond to the lean of the tree. Through use of the device in this manner, even a leaning tree may be made to fall so as to finally lie along the line of aim.

When the device of the preferred embodiment used on a tree which stands vertically, the angle adjusting body 15 is normally locked to the main guide plate 10 in a "centered" position so that an angle measured between the aiming rod 6 and either arm 17 or 18 is the same. However when used on a tree which is leaning, the angle adjusting body 15 is adjusted to and fixed at an angle corresponding to the effective angle of lean of the tree as viewed along the line of aim, i.e. the angle of lean of the tree with respect to a vertical plane through the line of aim. It must be noted that tree which is already leaning in the direction of aim has no effective lean with respect to the direction of aim. The sequence of steps for marking and felling a leaning tree is essentially the same as that described for a marking a tree which stands vertically. However, either before or after the aiming rod 6 is aligned in the direction in which the tree is to be felled and secured into the tree, the angle adjusting body 15 is adjusted as described above to compensate for the lean of the tree. Thumb latch 37 operates a spring biased pin which engages with a positioning detent 11 to fix the position of adjusting body 15. The adjusting body is released and rotated horizontally about pivot 16 in a direction away from the direction of lean of the tree and through an angle equal to the angle of lean of the tree. The procedure is then continued as described above with levelling of the main guide plate 10 and affixing of the tree penetrating spikes 25 and 26. The face notch apex is thereby moved to a position which accurately determines the direction of fall by compensating for the effective lean of the tree. Because of the potential danger and difficulty of felling a leaning tree and the fact that some trees may have an amount or direction of lean which may prevent safe or accurate felling in a particular direction, plate 10 may be further be marked with color coded areas 41, 42 and 43 with respective recognized warning colors of, for example, green, yellow, and red to provide visual warning of the potential degree of difficulty posed by a tree with the indicated amounts of effective lean.

Figure 14:
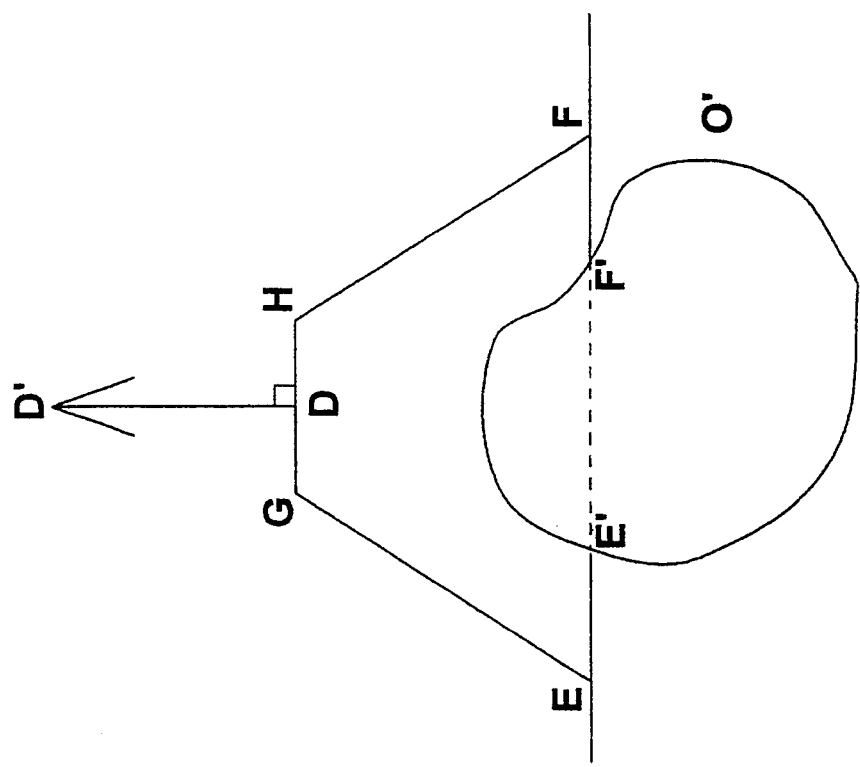
FIG. 14 is an illustration of additional geometric principles of the preferred embodiment.

To address the problem of trees having trunks with irregular or non-circular cross sections the preferred embodiment incorporates elongated and slidable rod-like spikes 25 and 26, with the spikes being pivotably mounted to allow them to be adjusted to have a common axis and be collinear at all times. This structure relies upon a geometric principle illustrated in FIG. 14 and slightly different from that previously described. In order to allow defining a face notch with an apex corresponding to a chord across the cross section of a tree trunk, this structure at all times defines the equivalent of an isosceles trapezoid or isosceles triangle in which a base of the figure is defined by the axis of the collinear spikes and the two legs are defined by the arms 17 and 18 and their respective extensions 27 and 28. It is to be understood that extending the legs of an isosceles trapezoid until they meet creates an isosceles triangle. FIG. 14 shows a closed curve O' corresponding to the cross section of tree trunk. Isosceles trapezoid GEFH by definition has parallel bases GH and EF and equal length legs EG and FH. Also by definition, angle EGH is equal to angle FHG and angle GEF is equal to angle HFE. The direction of aim as represented by DD' is perpendicular to GH and is, therefore, also perpendicular to EF and its segment E'F' which forms a chord of the closed curve O'. As long as GEFH is an isoscles trapezoid with its inherent relationships, DD' will be perpendicular to E'F' regardless of the regularity or symmetry of the closed curve O.' As shown in FIG. 1 when the arms 17 and 18 are parallel to one another, the spikes 25 and 26 are oriented perpendicular to the arm extensions 27 and 28 when the spikes are collinear with one another. As the arms are rotated or pivoted toward or away from one another through any given angle, which is indicated by a marker window 23 with an indicator 24 positioned over the gears 2 and 2', each spike is also pivoted through the same angle as indicated by a protractor-like angle indicator 31 which provides a visual indication of the angle between an arm 17 or 18 and its respective spike. In order to maintain the collinear relationship of the spikes 25 and 26, each spike is pivoted with respect to the arm in a direction opposite to the pivoting movement of its arm and through an angle equal to that of the rotation of the arm. Each pivot screw 32 may also be tightened to lock each spike in place after it is pivoted into position.

The orientation of the line defined by the spikes and the corresponding face notch is thus precisely defined without being dependent upon the regularity or symmetry of the cross sectional shape of the tree trunk.

Figure 11:
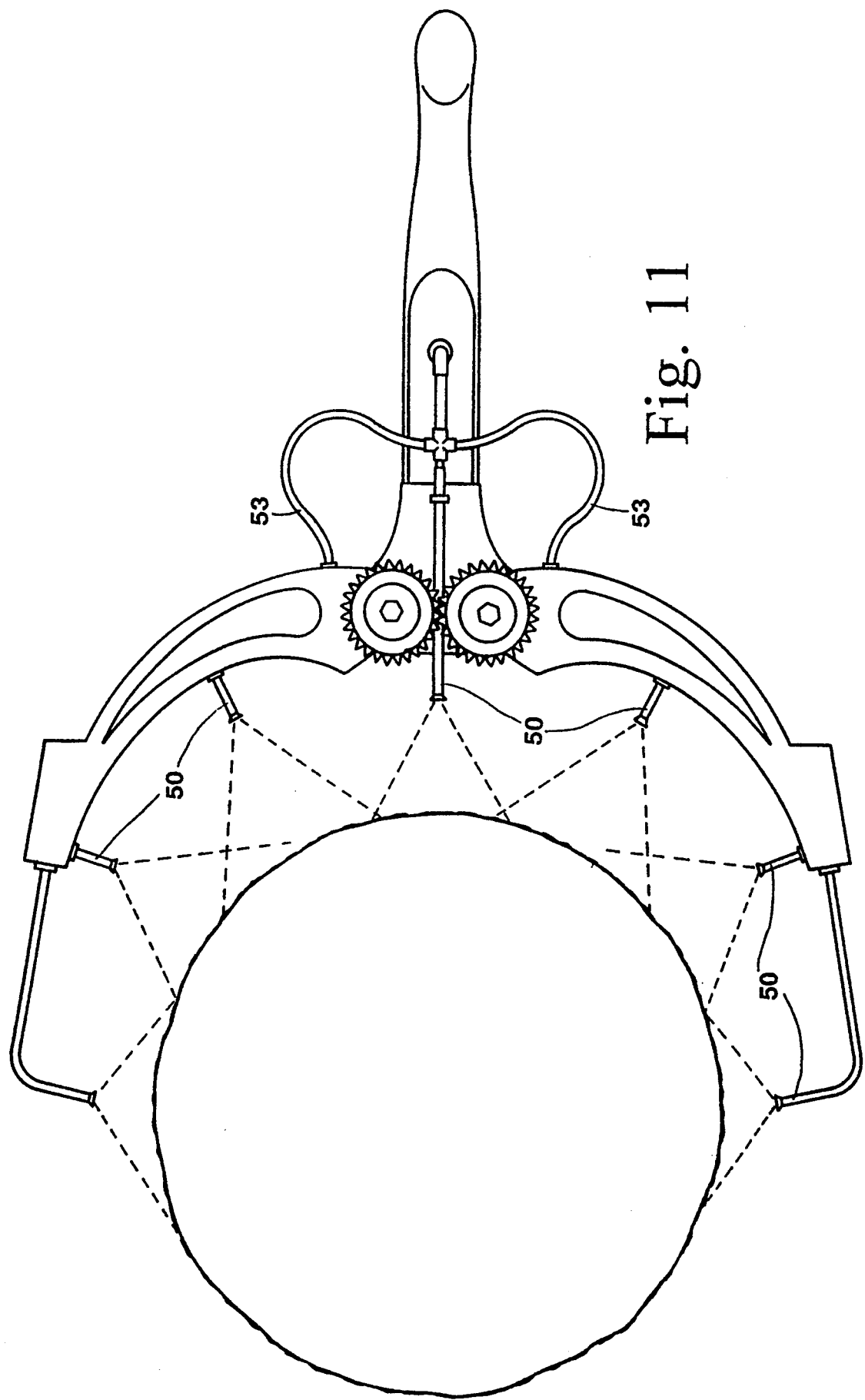
FIG. 11 is a plan view of an alternative embodiment which incorporates a manually operable spray head to accomplish the marking of the tree trunk.
Figure 12:
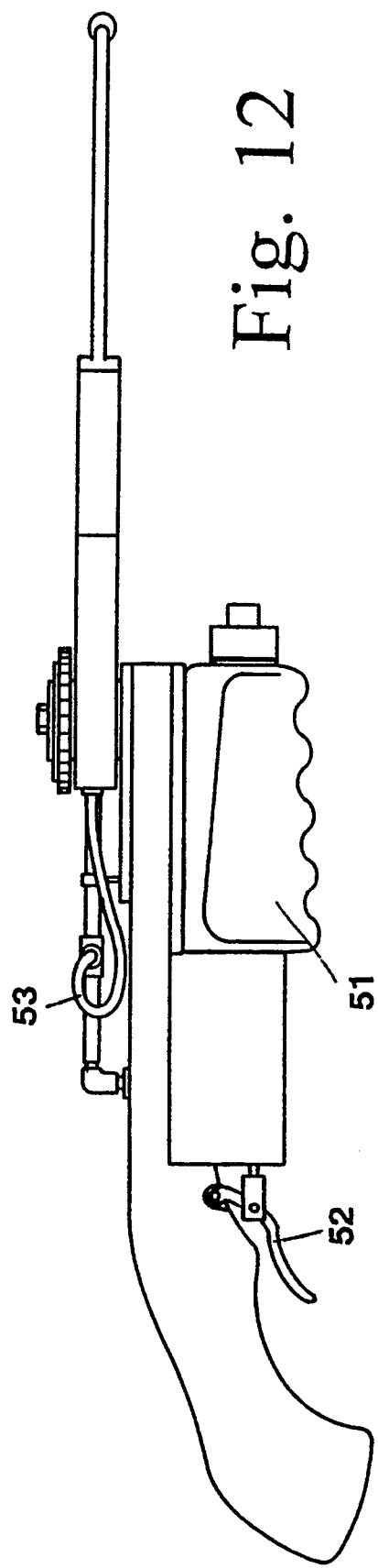
FIG. 12 is a side view of the alternative embodiment of FIG. 11 showing detail of the marking spray pump assembly.

In an alternative embodiment, as shown in FIGS. 11 and 12, in lieu of using the device as a mechanical guide for marking of the tree trunk, the marking is accomplished by incorporating numerous spray heads 50 positioned along the pivot arms. The indicating means formed by these spray heads are comprised of nozzles which are configured to each create a planar fan-like pattern of spray with the respective fan patterns being directed in an essentially coplanar fashion and where the patterns of adjacent spray heads meet or overlap. Paint or similar marking fluid is stored in a common reservoir 51 and provided to each nozzle through tubing 53, with the flow of the fluid being controlled manually by a trigger 52 so that the device may be held and operated in a gun-like fashion. The reservoir may be pressurized so that the manual trigger means need only comprise a valve for controlling flow of the fluid. Alternatively the trigger means may actuate a mechanical pump to cause the flow of fluid to the nozzles. Once the device is positioned, paint or other suitable marking fluid is ejected from the nozzles onto the tree in a linear pattern to mark each of the' cuts to be made to create a face notch. While the device may be hand held and provided with a bubble level to insure the level alignment of the device and resulting marks on the tree trunk, it may also incorporate the aiming rod and tree engaging spikes of the preferred embodiment. Alternatively the spray heads and trigger and pump means of the alternative embodiment may be incorporated into the apparatus of the preferred embodiment.

Other variations within the scope of this invention will be apparent from the described embodiment and it is intended that the present descriptions be illustrative of the inventive features encompassed by the appended claims.

What is claimed is:

1. A tree marking device for use in marking the location on a tree trunk for a hinging notch to be cut in the trunk to encourage the tree to fall with an upper part of the trunk falling to the ground in a desired direction relative to the base of the tree trunk, said device comprising:

aiming means having direction-pointing means manually movable to a first position at one side of the tree trunk with said direction-pointing means aimed along a first line pointing away from the trunk in said desired direction, indicating means partially encircling the tree trunk and identifying the location for a generally horizontal portion of said hinging notch when said aiming means is located adjacent to the tree trunk and said direction-pointing means is aimed in the direction of said first line, said aiming means being manually movable to a second position adjacent to the tree trunk in which said direction-pointing means is angularly adjusted relative to said first line by movement of the aiming means to define a second line pointing outwardly and upwardly from the tree trunk and in the same vertical plane as said first line, said indicating means providing, when said direction-pointing means is pointed along said second line, an identification of a location for an inclined portion of the hinging notch.

2. A tree marking device according to claim 1 wherein said indicating means comprises a pair of arms extending in opposite directions to partially encircle the tree trunk.

3. A tree marking device according to claim 2 wherein said device includes a prong on each of said arms which can be stuck into the tree trunk at the end points of the hinging notch to be cut.

4. A tree marking device according to claim 2 wherein said indicating means includes arms of adjustable length to facilitate marking trees of different diameters.

5. A tree marking device according to claim 2 wherein said arms include a plurality of spray nozzles to spray a pattern of a visible medium on the trunk to mark where the hinging notch is to be cut, and manually operated means to control the flow of the spray medium from said nozzles.

6. A tree marking device according to claim 5 wherein said device includes two prongs which can be stuck into the tree trunk at the end points of the hinging notch to be cut and to fix the location of an axis about which the indicating means is angularly adjusted to mark the hinging notch to be cut.

7. A tree marking device according to claim 2 wherein said arms are angularly adjustable relative to each other to facilitate marking trees of different diameters.

8. A tree felling accessory device for use in identifying the location on a tree trunk for a hinging notch to be cut in the trunk to encourage the tree to fall with an upper part of the trunk falling to the ground in a desired direction relative to the base of the tree trunk, said device comprising:

aiming means having direction-pointing means manually movable to a first position at one side of the tree trunk with said direction-pointing means aimed along a first line pointing away from the trunk in said desired direction, indicating means partially encircling the tree trunk and having two trunk-engaging parts identifying the location of two respective end points of a generally horizontal portion of said hinging notch when said aiming means is located adjacent to the tree trunk and said direction-pointing means is aimed in the direction of said first line, said indicating means being manually movable to a second position adjacent to the tree trunk in which said indicating means is angularly adjusted relative to said horizontal portion of the notch interconnecting said two end points, said indicating means providing, when in said second position, an identification of a location for an inclined portion of the hinging notch.

9. A tree marking device according to claim 8 wherein said trunk-engaging parts are pointed members driveable into the trunk surface to mark said two points.

10. A tree marking device according to claim 9 wherein said pointed members form pivot points for the angular adjustment of the indicating means.

11. A tree marking device according to claim 9 wherein the line interconnecting said end points is essentially perpendicular to a vertical plane containing said first line.

12. A tree marking device according to claim 9 including means to adjust the angle of the line interconnecting said end points in a manner dependent on the lean of the tree trunk so that said hinging notch will be oriented to cause said upper part of a leaning tree to fall to the ground in said desired direction relative to the base of the tree trunk.

13. A tree marking device according to claim 12 wherein said indicating means provides for a leaning tree trunk an acute angle between said desired direction and the line interconnecting said end points with the end point on the side of the trunk toward which the trunk leans being offset in said desired direction relative to the other end point.

14. A tree marking device according to claim 12 wherein the means to adjust the angle of the line interconnecting said end points includes adjustment means having a plurality of selectable positions which are correlated to different degrees of lean of the tree trunk relative to a vertical plane containing said first line.

15. A tree marking device for use in marking the location on a tree trunk for a hinging notch to be cut in the trunk to encourage the tree to fall with an upper part of the trunk falling to the ground in a desired direction relative to the base of the tree trunk, said device comprising:

aiming means having direction-pointing means manually movable to a first position at one side of the tree trunk with said direction-pointing means aimed along a first line pointing away from the trunk in said desired direction, indicating means partially encircling the tree trunk and having means to physically mark the surface of the tree trunk to identify the location for a generally horizontal portion of said hinging notch when said aiming means is located adjacent to the tree trunk and said direction-pointing means is aimed in the direction of said first line, said aiming means being manually movable to a second position adjacent to the tree trunk in which said direction-pointing means is angularly adjusted relative to said first line by movement of the aiming means to define a second line pointing outwardly and upwardly from the tree trunk, said indicating means providing, when said direction-pointing means is pointed along said second line, an orientation of the means to physically mark the surface of the tree trunk to identify a location for an inclined portion of the hinging notch.

16. A tree marking device according to claim 15 wherein said means to physically mark the surface of the tree trunk includes means to physically deform the trunk surface.

17. A tree marking device according to claim 15 wherein said means to physically mark the surface of the tree trunk includes means to spray a visible marking medium on the trunk surface.

18. A tree marking device according to claim 17 wherein said device includes a gun-like structure for spraying said medium.

19. A tree marking device according to claim 18 wherein said gun-like structure includes a trigger means which is manually actuated to spray markings on the trunk corresponding to the two cuts for the hinging notch.

20. A tree marking device according to claim 17 wherein said spray means includes a plurality of spray nozzles each providing a flat fan-like spray pattern, the spray patterns from the plurality of nozzles being coplanar to provide a line-like mark on the tree trunk when the spray means is actuated to locate a respective cut to be made for one side of the hinging notch.

* * * * *